US012675539B2

(12) United States Patent
Zhou et al.

(10) Patent No.: US 12,675,539 B2
(45) Date of Patent: Jul. 7, 2026

(54) METHOD AND APPARATUS FOR PROCESSING USER BEHAVIOR DATA

(71) Applicant: ALIBABA GROUP HOLDING LIMITED, George Town (KY)

(72) Inventors: Jun Zhou, Hangzhou (CN); Qing Cui, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 1011 days.

(21) Appl. No.: 16/045,625

(22) Filed: Jul. 25, 2018

(65) Prior Publication Data

US 2018/0330001 A1 Nov. 15, 2018

Related U.S. Application Data

(63) Continuation of application No. PCT/CN2017/071241, filed on Jan. 16, 2017.

(30) Foreign Application Priority Data

Jan. 25, 2016 (CN) .......................... 201610048385.8

(51) Int. Cl.
*G06F 16/9535* (2019.01)

(52) U.S. Cl.
CPC ................................. *G06F 16/9535* (2019.01)

(58) Field of Classification Search
None
See application file for complete search history.

(56) References Cited

U.S. PATENT DOCUMENTS 8,380,705 B2 * 2/2013 Tong ................... G06F 16/9538
707/751
8,567,672 B2 * 10/2013 Mesaros ............ G06Q 30/0611
705/14.1

(Continued)

FOREIGN PATENT DOCUMENTS

CN 102075352 A 5/2011
CN 102890689 A 1/2013

(Continued)

OTHER PUBLICATIONS

First Chinese Search Report dated Dec. 6, 2017, issued by the State Intellectual Property Office of the People's Republic of China in counterpart Chinese Patent Application No. 201610048385.8 (1 page).

(Continued)

*Primary Examiner* — Sherief Badawi
*Assistant Examiner* — Jessica N Le
(74) *Attorney, Agent, or Firm* — Finnegan, Henderson, Farabow, Garrett & Dunner, LLP

(57) ABSTRACT

The present disclosure provides methods and apparatuses for processing user behavior data. One exemplary processing method comprises: acquiring behavior data of a user, and a time at which the behavior data is generated; determining at least one of a timeliness factor and a periodicity factor corresponding to the behavior data according to the time at which the behavior data is generated and a current time; and adjusting the behavior data according to the at least one of the timeliness factor and the periodicity factor. With the processing methods provided by the present disclosure, the timeliness of the user behavior data can be improved. The preference and interest of the user can be acquired more effectively. That way, tailor search results can be provided to (Continued)

meet the demand of the user, thereby improving user experience.

16 Claims, 4 Drawing Sheets

(56)                    References Cited

U.S. PATENT DOCUMENTS

| | | | | | |
|---|---|---|---|---|---|
| 8,954,420 | B1 * | 2/2015 | Khan | ............... | G06F 16/24578 707/723 |
| 9,009,146 | B1 * | 4/2015 | Lopatenko | ................ | H04L 9/40 707/723 |
| 9,081,857 | B1 * | 7/2015 | Huet | ................... | G06F 16/9535 |
| 9,665,622 | B2 * | 5/2017 | Sun | ..................... | G06F 16/2455 |
| 10,268,960 | B2 * | 4/2019 | Yao | ......................... | G06N 5/022 |
| 2006/0010128 | A1 * | 1/2006 | Suzuki | .................... | G06F 16/35 |
| 2006/0041550 | A1 * | 2/2006 | Bennett | .............. | G06F 16/9538 707/999.005 |
| 2006/0064411 | A1 * | 3/2006 | Gross | .................... | G06F 16/951 |
| 2006/0136528 | A1 * | 6/2006 | Martin | ............. | G06F 17/30719 |
| 2007/0061195 | A1 * | 3/2007 | Liu | .................... | G06Q 30/0257 705/14.66 |
| 2009/0089233 | A1 | 4/2009 | Gach et al. | | |
| 2009/0292743 | A1 * | 11/2009 | Bigus | .................... | G06F 21/552 |
| 2010/0106703 | A1 * | 4/2010 | Cramer | ............. | G06Q 30/0256 707/706 |
| 2012/0036037 | A1 * | 2/2012 | Xiao | ...................... | G06Q 30/00 705/26.7 |
| 2012/0143790 | A1 * | 6/2012 | Wang | ................... | G06F 16/951 706/12 |
| 2013/0046772 | A1 * | 2/2013 | Gu | ........................ | G06F 16/435 707/E17.014 |
| 2013/0132356 | A1 * | 5/2013 | Chen | ................. | G06Q 30/0282 707/706 |
| 2013/0166488 | A1 * | 6/2013 | Yang | ....................... | G06N 5/02 706/46 |
| 2013/0173571 | A1 * | 7/2013 | Chen | .................... | G06F 16/951 707/706 |
| 2013/0339350 | A1 * | 12/2013 | Wei | ........................ | G06Q 30/02 707/723 |
| 2014/0053173 | A1 * | 2/2014 | Oh | ................... | H04N 21/44218 725/12 |
| 2014/0280120 | A1 * | 9/2014 | Sharp | ................ | G06F 16/24578 707/732 |
| 2016/0125080 | A1 * | 5/2016 | Glover | .................. | G06F 16/951 707/706 |
| 2017/0075997 | A1 * | 3/2017 | Wan | .................... | G06F 16/9535 |
| 2017/0351739 | A1 * | 12/2017 | Zou | ................... | G06F 16/24575 |

FOREIGN PATENT DOCUMENTS

| | | |
|---|---|---|
| CN | 103164804 A | 6/2013 |
| CN | 104216884 A | 12/2014 |
| JP | 2006024158 A | 1/2006 |
| JP | 2007172249 A | 7/2007 |
| JP | 2011065633 A | 3/2011 |
| JP | 2012037962 A | 2/2012 |
| JP | 2014232346 A | 12/2014 |
| WO | WO 2017/128973 A1 | 8/2017 |

OTHER PUBLICATIONS

Second Office Action dated Jul. 16, 2018, issued by The State Intellectual Property Office of the People's Republic of China in counterpart Chinese Patent Application No. 201610048385.8.

Third Office Action dated Nov. 23, 2018, issued by The State Intellectual Property Office of the People's Republic of China in counterpart Chinese Patent Application No. 201610048385.8.

PCT International Search Report and Written Opinion mailed Apr. 17, 2017, issued in corresponding International Application No. PCT/CN2017/071241 (16 pages).

Japanese Office Action issued in corresponding Japanese Application No. 2018-538558 on Feb. 12, 2021 (8 pages).

Supplemental Chinese Search Report issued in corresponding Chinese Application No. 201610048385.8 on Jul. 23, 2019 (1 page).

Japanese Search Report issued in Japanese Application No. 2018-538558 dated Jan. 21, 2021, 23 pages.

* cited by examiner

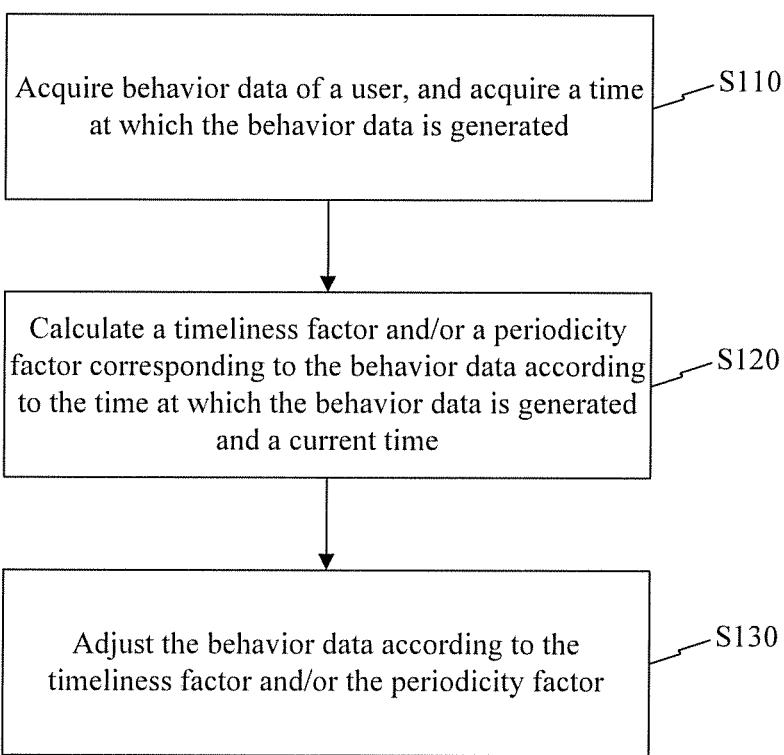

100

Acquire behavior data of a user, and acquire a time at which the behavior data is generated — S110

Calculate a timeliness factor and/or a periodicity factor corresponding to the behavior data according to the time at which the behavior data is generated and a current time — S120

Adjust the behavior data according to the timeliness factor and/or the periodicity factor — S130

METHOD AND APPARATUS FOR PROCESSING USER BEHAVIOR DATA

This application claims priority to International Application No. PCT/CN2017/071241, filed on Jan. 16, 2017, which claims priority to and the benefits of Chinese Application No. 201610048385.8, filed on Jan. 25, 2016, both of which are incorporated herein by reference in their entireties.

TECHNICAL FIELD

The present disclosure generally relates to the technical field of internet technologies, and in particular, to methods and apparatuses for processing user behavior data.

BACKGROUND

Search engines generally optimize rankings of multiple search results by analyzing historical log data using machine learning methods. User preferred search results are predicted according to historical data of the last two weeks, one month, or a longer time, in order to obtain better search results.

With the existing techniques, one problem lies in that a search engine generally treats all historical data equally, when optimizing the rankings of search results according to historical log data. When predicting user preference according to user behavior logs, the search engine does not differentiate historical data according to their relative importance. For example, the search engine does not differentiate between the importance of a behavior log generated 10 days ago and the importance of historical data generated 1 day ago. The search engine uses all the historical data to predict the user preference through machine learning, assuming that the historical data has the same degrees of importance. In view of this, the search engine cannot effectively capture changes of the users' interests, and therefore cannot meet users' requirements.

SUMMARY

The present disclosure provides methods and apparatuses seeking to address the foregoing technical problems. For example, the present disclosure provides methods for processing user behavior data. One objective of the method embodiments is to improve the timeliness of the user behavior data, and to acquire the preference and interest of the user more effectively. That way, search results more tailored to meet user demand can be provided, and user experience can be improved. Further, the present disclosure also provides apparatuses for processing user behavior data.

According to some embodiments of the present disclosure, methods for processing user behavior data are provided. One exemplary method comprises: acquiring behavior data of a user, and acquiring a time at which the behavior data is generated; calculating a timeliness factor and/or a periodicity factor corresponding to the behavior data according to the time at which the behavior data is generated and the current time; and adjusting the behavior data according to the timeliness factor and/or the periodicity factor.

The processing method embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

According to some embodiments of the present disclosure, apparatus for processing user behavior data are provided. One exemplary apparatus comprises: an acquisition module configured to acquire behavior data of a user, and acquire a time at which the behavior data is generated; a calculation module configured to calculate a timeliness factor and/or a periodicity factor corresponding to the behavior data according to the time at which the behavior data is generated and the current time; and a processing module configured to adjust the behavior data according to the timeliness factor and/or the periodicity factor.

The processing apparatus embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

Various aspects and advantages of the present disclosure will be illustrated in the following descriptions. Other aspects or embodiments of the present applicant can be appreciated based on the following descriptions, or through implementation of the present disclosure.

BRIEF DESCRIPTION OF THE DRAWINGS

To facilitate understanding of the above and additional aspects and advantages of the present disclosure, exemplary embodiments will be described below with reference to the accompanying drawings.

FIG. 1 is a flowchart of an exemplary method for processing user behavior data according to some embodiments of the present disclosure.

DETAILED DESCRIPTION

Figure 2:
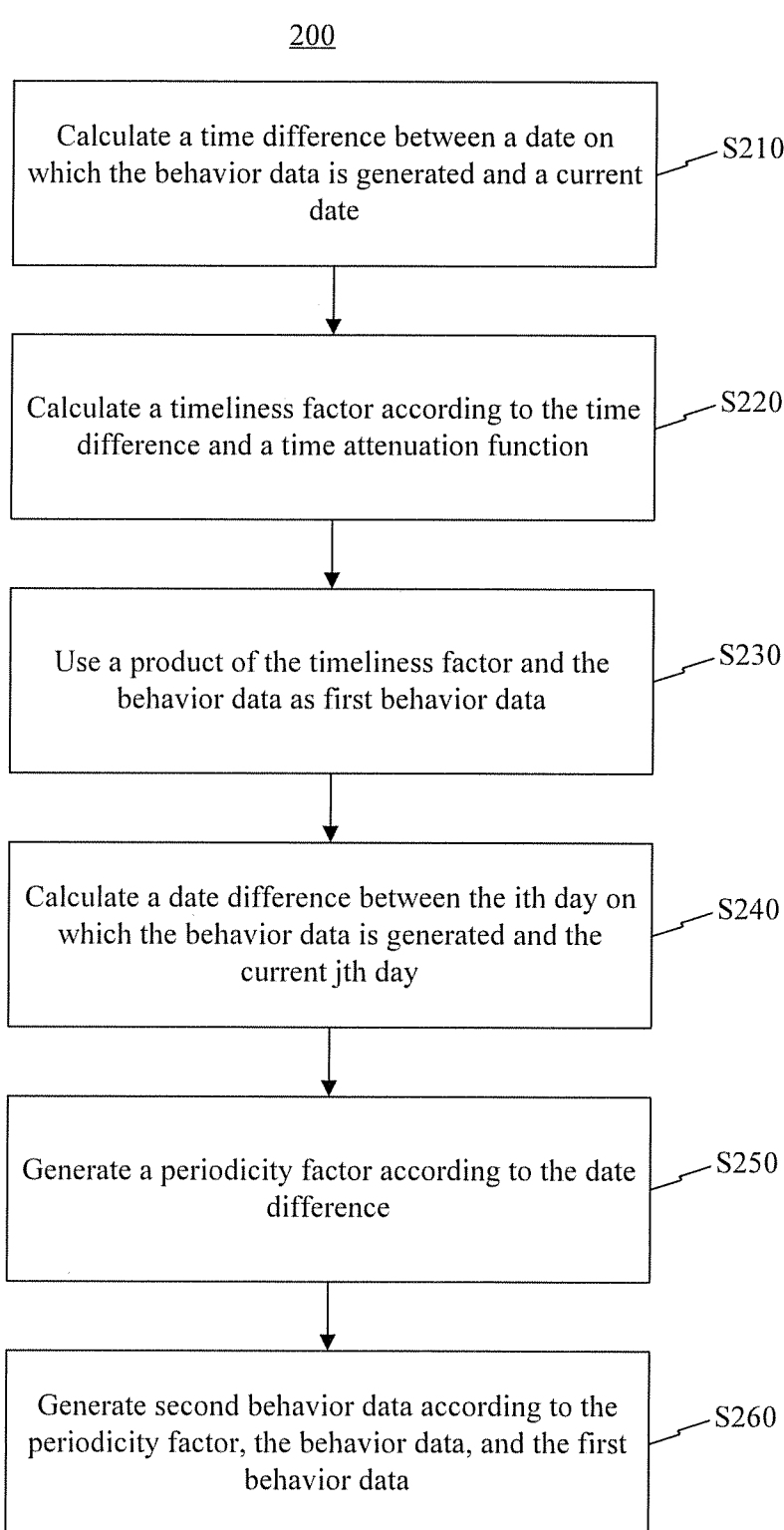
FIG. 2 is a flowchart of an exemplary method for processing user behavior data according to some embodiments of the present invention.

Some exemplary embodiments of the present disclosure will be described in detail in the following. Some examples are illustrated in the accompanying drawings. Same or similar reference numerals used in the description herein may represent identical or similar elements, or elements having identical or similar functions. The embodiments described in the following with reference to the accompanying drawings are exemplary and intended to explain the present disclosure. They do not constitute a limitation to the present disclosure.

Exemplary methods and apparatuses for processing user behavior data according to some embodiments of the present disclosure are described in the following with reference to the accompanying drawings.

FIG. 1 is a flowchart of an exemplary method 100 for processing user behavior data according to some embodiments of the present disclosure. As shown in FIG. 1, the exemplary processing method includes the following steps S110-S130.

In step S110, behavior data of a user can be acquired. A time at which the behavior data is generated can further be acquired. For example, the format of behavior data can be as shown in the following table:

| features | label | date |
|---|---|---|
| city__1,age__2,age__city__4 | 0^1 | 2015 Nov. 24 |
| city__6,age__20,age__city__3 | 1^0 | 2015 Nov. 20 |
| city__199,age__10,age__city__1 | 0^1 | 2015 Nov. 2 |

In the above exemplary table, the features column represents features associated with the behavior data, the label column represents clicking behaviors of users. The labels are divided into two parts by using ^. If the first part is 1, it indicates that a user clicks. If the second part is 1, it indicates that a user does not click. The date column represents times at which the click behaviors are generated.

In step S120, a timeliness factor and/or a periodicity factor corresponding to the behavior data can be calculated according to the time at which the behavior data is generated and the current time. For example, user A accesses mobile phone displayed pages for multiple times within the past month. However, the relevance of mobile phone pages browsed by the user in the past week is different from the relevance of mobile phone pages browsed by the user one month ago. Obviously, a more recent user behavior has greater relevance or importance and can better reflect the search requirements of the user. Therefore, historical data may be assigned different degrees of importance according to a chronological order, when using historical data for learning.

In some embodiments, some user behaviors can be periodic. For example, an office worker user B often purchases food materials online on weekends, because user B has time to cook only on weekends. Monday is very close to the previous weekend. However, behaviors of user B on Monday can still be very different from his behaviors over the weekend. Therefore, the influence of periodicity needs to be considered when historical data is used for learning. The historical data can be assigned different degrees of importance according to similarities between the historical data and the current periodicity in a certain dimension.

For example, a time difference between the time at which the behavior data is generated and the current time can be calculated. A timeliness factor Z can be calculated according to a certain function. A periodicity factor C can also be calculated by using a certain function, based on the time at which the behavior data is generated and the current time.

In some embodiments of the present invention, before the timeliness factor Z and the periodicity factor C are calculated, the behavior data can be first input to a data division apparatus, which can divide the behavior data into multiple small behavior data blocks. The data division apparatus can determine the number of behavior data blocks, according to the size of the behavior data and the amount of data that can be processed by each computing machine. The data division apparatus divides the behavior data in a distributed environment. Therefore, the division operation can be accelerated by fully utilizing resources of multiple computing machines. After dividing the behavior data, the data division apparatus can distribute each small behavior data block to each computing machine. The multiple computing machines can process the behavior data blocks simultaneously in parallel, wherein behavior data blocks acquired by any two computing machines do not overlap each other.

In step S130, the behavior data can be adjusted according to the timeliness factor and/or the periodicity factor. In some embodiments, a new click behavior $label_1$ can be calculated according to the timeliness factor Z and the click behavior label of the user. For example, the new click behavior $label_1$ can be calculated according to the following formula: $label_1 = Z*label$. A new click behavior $label_2$ can be calculated according to the periodicity factor C and the new click behavior $label_1$. In other words, timeliness and periodicity influences can be applied to the user behavior data. Rankings of multiple search results can be optimized through machine learning methods by using the obtained adjusted behavior data.

It is appreciated that the user behavior data can be adjusted according to the timeliness factor Z alone, or according to the periodicity factor C alone. Alternatively, the user behavior data can be adjusted according to both the timeliness factor Z and the periodicity factor C. For example, the user behavior data can be adjusted first according to the timeliness factor Z and then according to the periodicity factor C.

The processing method embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

In order to more clearly describe the methods for processing user behavior data provided in the present disclosure, an example process of adjusting user behavior data according to both the timeliness factor Z and the periodicity factor C is illustrated in the following.

Figure 3:
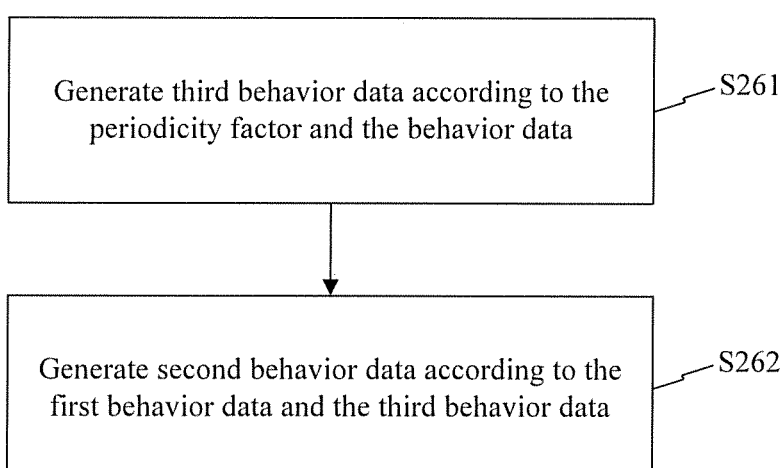
FIG. 3 is a flowchart of an exemplary method for processing user behavior data according to some embodiments of the present invention.

FIG. 2 is a flowchart of an exemplary method 200 for processing user behavior data according to some embodiments of the present invention. FIG. 3 is a flowchart of an exemplary process 300 for processing user behavior data according to some embodiments of the present invention. As shown in FIG. 2 and FIG. 3, the method for processing user behavior data includes the following procedures.

In step S210, a time difference between a date on which the behavior data is generated and a current date can be calculated. In this example, dates are used to represent the time at which the behavior data is generated and the current time.

In step S220, a timeliness factor is calculated according to the time difference and a time attenuation function. The time attenuation function can be an exponential function or a power function.

In step S230, a product of the timeliness factor and the behavior data is used as first behavior data.

In step S240, a date difference between the $i^{th}$ day on which the behavior data is generated and the current $j^{th}$ day is calculated. The time at which the behavior data is generated and the current time are respectively the $i^{th}$ day and the $j^{th}$ day in a preset time period/cycle, wherein the preset time period has N days, and i and j are positive integers less than or equal to N.

In step S250, the periodicity factor is generated according to the date difference. For example, the periodicity factor can be generated by using the following formula:

$$1/\sqrt{\min(|d_j-d_i|,N-|d_j-d_i|)},$$

In the above example, di is the $i^{th}$ day on which the behavior data is generated, and dj is the current $j^{th}$ day.

In step S260, second behavior data is generated according to the periodicity factor, the behavior data, and the first behavior data.

In some embodiments of the present invention, as shown in FIG. 3, the step of generating second behavior data according to the periodicity factor, the behavior data, and the first behavior data can include the following procedures.

In step S261, third behavior data is generated according to the periodicity factor and the behavior data.

In step S262, the second behavior data is generated according to the first behavior data and the third behavior data. The first behavior data can be added to or multiplied by the third behavior data to generate the second behavior data.

For example, the user click behavior label in the user behavior data and the time (in this example, time is represented by date) at which the click behavior is generated can be input. The user behavior data can be assigned weights according to a time attenuation rule. It should be appreciated that, after the user behavior data is divided, only the user click behavior label and the date on which the click behavior is generated need to be input. Therefore, the amount of data processed by each computing machine can be greatly reduced. Assuming that to is the current date, and t is the date on which the behavior data is generated, $t_0-t$ can be used to measure a distance from the user behavior data to the current date. If the time attenuation function f(x) is a decreasing function, that is, f(x) is a decreasing function in $[0,+\infty]$, $f(t_0-t)$ provides a method for weighting the behavior data according to time attenuation. For example, a weight of behavior data one day before the current date can be f(1), a weight of behavior data three days before the current date can be f(3), and so on. As f(x) is a decreasing function, f(1)>f(3), the behavior data farther from the current time is assigned a smaller weight. In some embodiments, the time attenuation function f(x) can be an exponential function $f(x)=a^x$, $0<a<1$, and can also be a power function $f(x)=x^{-a}$, $a>0$, and the like.

It should be appreciated that, when weights are assigned for the user behavior data according to the time attenuation rule, the current time and the time at which the behavior data is generated may use day as a unit, that is, using the current date and the date on which the behavior data is generated. Other time units can also be used, such as hour, minute, or the like. In this example, illustration is made only by using day as a unit. Similar processing can be implemented by using other time units, such as hour or minute, for calculating the behavior data. Details of using other units will not be repeated here to avoid redundancy.

Further, a difference between the date on which the behavior data is generated and the current date is calculated to obtain a time difference. That is, the date of the behavior data can be subtracted from the current date to obtain the time difference. Then, an exponential function or a power function can be selected to calculate a timeliness factor Z. For example, the timeliness factor Z can be calculated according to an exponential function $f(x)=0.98^x$. A user click behavior $label_1$ after the timeliness processing can be calculated. For example, $label_1$ can be the user click behavior label multiplied by the timeliness factor Z, that is $label_1=Z*label$.

The user click behavior $label_1$ after the timeliness processing, the user click behavior label, and the date on which the click behavior is generated are input. A periodicity factor C can be obtained according to a time difference by using the formula $1/\sqrt{\min(|d_j-d_i|,N-|d_j-d_i|)}$. For example, assume that the date on which the behavior data is generated is the $d_i^{th}$ day in a week. By taking seven days in a week as an example, Monday to Sunday can be respectively recorded with numerals 1 to 7, and a weight of the behavior data on the current $d_j^{th}$ day is $1/\sqrt{\min(|d_j-d_i|,N-|d_j-d_i|)}$ wherein N equals 7.

It should be appreciated that periodicity is described herein by using the days in a week as an example. Any other periodic unit can be used in a similar manner, for example, periodicity can be in the form of 24 hours in a day, seasonal divisions, or rise and fall of temperatures.

In some embodiments, adjusted behavior data $label_2$ can be calculated according to a selected superposition relationship. The superposition relationship can be addition, multiplication, or the like. For example, if the superposition relationship is addition, $label_2$ can be calculated by:

$$label_2=label_1+label*1/\sqrt{\min(|d_j-d_i|,N-|d_j-d_i|)}.$$

If the superposition relationship is multiplication, $label_2$ can be calculated by:

$$label_2=label_1*label*1/\sqrt{\min(|d_j-d_i|,N-|d_j-d_i|)}.$$

Rankings of multiple search results can be optimized through machine learning by using the obtained adjusted behavior data $label_2$.

The processing method embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

According to some embodiments of the present disclosure, apparatuses for processing user behavior data are provided.

Figure 4:
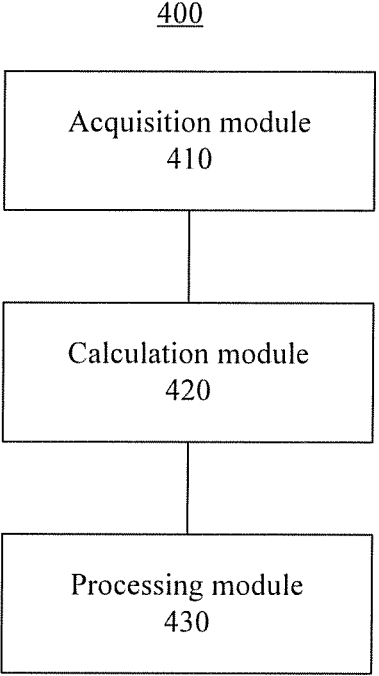
FIG. 4 is a schematic structural diagram of an exemplary apparatus for processing user behavior data according to some embodiments of the present disclosure.

FIG. 4 is a schematic structural diagram of an exemplary apparatus 400 for processing user behavior data according to an embodiment of the present disclosure.

As shown in FIG. 4, the processing apparatus 400 includes an acquisition module 410, a calculation module 420, and a processing module 430.

The acquisition module 410 can be configured to acquire behavior data of a user and a time at which the behavior data is generated.

The calculation module 420 can be configured to calculate a timeliness factor and/or a periodicity factor corresponding to the behavior data according to the time at which the behavior data is generated and the current time.

The processing module 430 can be configured to adjust the behavior data according to the timeliness factor and/or the periodicity factor.

It should be appreciated that the explanation and description of the foregoing method embodiments for processing user behavior data are also applicable to the apparatus embodiments for processing user behavior data. Reference can be made to the above-described processes and implementation, which will not be repeated here.

The processing apparatus embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

To further describe the apparatus embodiments for processing user behavior data according to the present disclosure, such that those skilled in the art can understand the present disclosure more clearly, an example of adjusting the user behavior data according to both the timeliness factor Z and the periodicity factor C is illustrated in the following.

In some embodiments of the present disclosure, the time at which the behavior data is generated and the current time can be represented by the respective dates. The calculation module 420 can be configured to calculate a time difference between the date on which the behavior data is generated and the current date. The timeliness factor can be calculated according to the time difference and a time attenuation function. The time attenuation function can be an exponential function or a power function.

In some embodiments of the present disclosure, the time at which the behavior data is generated and the current time are respectively the $i^{th}$ day and the $j^{th}$ day in a preset time period/cycle. The preset time period has N days, and i and j are positive integers less than or equal to N. The calculation module 420 can be further configured to calculate a date difference between the $i^{th}$ day on which the behavior data is generated and the current $j^{th}$ day, and generate the periodicity factor according to the date difference. For example, the periodicity factor can be generated by using the following formula: $1/\sqrt{\min(|d_j-d_i|,N-|d_j-d_i|)}$, wherein di is the $i^{th}$ day on which the behavior data is generated, and dj is the current $j^{th}$ day.

In some embodiments of the present disclosure, the processing module 430 can be configured to adjust the behavior data according to the timeliness factor and the periodicity factor. A product of the timeliness factor and the behavior data can be used as first behavior data. Second behavior data can be generated according to the periodicity factor, the behavior data, and the first behavior data.

In some embodiments of the present disclosure, the processing module 430 can be further configured to generate third behavior data according to the periodicity factor and the behavior data; and generate the second behavior data according to the first behavior data and the third behavior data. For example, the first behavior data can be added to or multiplied by the third behavior data to generate the second behavior data.

It should be appreciated that, the explanation and description of the foregoing method embodiments for processing user behavior data are also applicable to the processing apparatuses. They can be implemented according to similar principles, which will not be repeated here.

The processing apparatus embodiments provided in the present disclosure assign user behavior data different degrees of importance, based on time attenuation and periodicity similarities. Rankings of multiple search results can be optimized using machine learning methods based on behavior data having different degrees of importance. That way, the timeliness of the user behavior data can be improved and the preference and interest of the users can be acquired more effectively. Accordingly, users can be provided with search results tailored to meet their demands, thereby improving user experience.

In the description of the present disclosure, it should be appreciated that, terms such as "first" and "second" are merely used for the purpose of description. They cannot be understood as indicating or implying relative importance, or indicating any mandatory number of described technical features. Therefore, features limited by "first" and "second" may explicitly or implicitly include one or more features. Further, in the description of the present disclosure, "multiple" means at least two, such as two or three, unless otherwise specified.

Reference throughout this specification to "an embodiment," "some embodiments," "an example," "a specific example," or "some examples" indicate that a specific feature, structure, material, or characteristic described in connection with such an embodiment or example is included in at least one embodiment of the present disclosure. The expression of these terms throughout this specification does not necessarily refer to the same embodiment or example. Further, the specific features, structures, materials, or characteristics may be combined in a suitable manner in one or more embodiments or examples. Moreover, in the absence of mutual contradiction, modification or combination can be made based on different embodiments or examples described in the specification, or based on the features of the different embodiments or examples.

The processes or methods described in the flowcharts or described in any other way herein may be understood to include one or more modules, segments or parts of executable instruction codes, to perform particular logic functions or processing. Moreover, the described embodiments of the present disclosure can include other implementations, in which the functions may be performed in an order different from what is depicted or discussed. For example, some procedures may be performed in a substantially simultaneous manner or in a reverse order. This should be appreciated by those skilled in the art based on the embodiments described in the present disclosure.

It should be appreciated that a part or all of some embodiments of the present disclosure may be realized by hardware, software, firmware or a combination thereof. In the above-described embodiments, a plurality of steps or functions may be implemented by software or firmware stored in a memory and executed by an appropriate instruction execution system. For example, if implemented by hardware, certain steps or functions may be implemented by one or a combination of the following: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall appreciate that all or a part of the steps in the method embodiments of the present disclosure may be implemented by commanding related hardware components with programs. The programs may be stored in a computer readable storage medium. When executed, the programs may cause the related hardware components to perform some or all the steps of the method embodiments. For example, the embodiments of the present disclosure may be in the form of a computer program product implemented on one or more computer usable storage media (including, but not limited to, a magnetic disk memory, a CD-ROM, an optical memory, and the like)

including computer-readable program codes therein. The storage media can include a set of instructions for instructing a computer device (which may be a personal computer, a server, a network device, a mobile device, or the like) or a processor to perform a part of the steps of the methods described in the embodiments of the present disclosure.

The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Several embodiments of the present disclosure have been shown and described above. It is appreciated that the above embodiments are exemplary and cannot be construed as limiting the scope of the present disclosure. Consistent with the present disclosure, those skilled in the art can make changes, modifications, replacements, and alterations to the embodiments, without departing from the principles described herein. Such variations shall all fall within the scope of the present disclosure.

The invention claimed is:

1. A method for providing ranked search results to a user based on user behavior data, comprising:
acquiring behavior data of the user from a search engine user behavior log, wherein the search engine user behavior log comprises a plurality of entries comprising:
feature data associated with the behavior data;
label data associated with click behavior; and
a time corresponding to the behavior data being generated according to the search engine;
determining a timeliness factor and a periodicity factor corresponding to the behavior data according to a time at which the behavior data is generated and a current time, wherein
the time at which the behavior data is generated and the current time are an $i^{th}$ day and a $j^{th}$ day in a preset time period having N days;
the timeliness factor provides a higher weight to behavior data closer to the current time;
the periodicity factor provides a higher weight to behavior data closer to a start of a time period and farther from the current time, wherein the behavior data repeats during each time period of a same length; and
determining the periodicity factor comprises:
determining a date difference between the $i^{th}$ day on which the behavior data is generated and the $j^{th}$ day; and
generating the periodicity factor according to the date difference;
weighting the behavior data of the time at which the behavior data is generated and the current time to generate a weighted value, wherein the weighted value is based on at least one of the timeliness factor or the periodicity factor;
adjusting the behavior data using the weighted value;

ranking the search results based on the adjusted behavior data; and
providing the ranked search results to the user.

2. The method for providing ranked search results to a user based on user behavior data according to claim 1, wherein adjusting the behavior data comprises:
obtaining a product of the timeliness factor and the behavior data as first behavior data; and
generating second behavior data according to the periodicity factor, the behavior data, and the first behavior data.

3. The method for providing ranked search results to a user based on user behavior data according to claim 2, wherein generating second behavior data according to the periodicity factor, the behavior data, and the first behavior data comprises:
generating third behavior data according to the periodicity factor and the behavior data; and
generating the second behavior data according to the first behavior data and the third behavior data.

4. The method for providing ranked search results to a user based on user behavior data according to claim 3, wherein the first behavior data is added to or multiplied by the third behavior data to generate the second behavior data.

5. The method for providing ranked search results to a user based on user behavior data according to claim 1, wherein determining the timeliness factor comprises:
determining a time difference between a date on which the behavior data is generated and a current date; and
determining the timeliness factor according to the time difference and a time attenuation function.

6. The method for providing ranked search results to a user based on user behavior data according to claim 5, wherein the time attenuation function comprises at least one of an exponential function and a power function.

7. The method for providing ranked search results to a user based on user behavior data according to claim 5, wherein determining the timeliness factor according to the time difference and a time attenuation function further comprising:
weighting the behavior data according to the time attenuation; and
generating a first weighted value to a first time before the current time and a second weighted value to a second time before the first time, wherein the second weighted value is smaller than the first weighted value.

8. An apparatus for providing ranked search results to a user based on user behavior data, comprising:
a memory storing a set of instructions;
a processor configured to execute the set of instructions to cause the apparatus to perform:
acquiring behavior data of the user from a search engine user behavior log, wherein the search engine user behavior log comprises a plurality of entries comprising:
feature data associated with the behavior data;
label data associated with click behavior; and
a time corresponding to the behavior data being generated according to the search engine;
determining a timeliness factor and a periodicity factor corresponding to the behavior data according to a time at which the behavior data is generated and a current time, wherein
the time at which the behavior data is generated and the current time are an $i^{th}$ day and a $j^{th}$ day in a preset time period having N days;

the timeliness factor provides a higher weight to behavior data closer to the current time;

the periodicity factor provides a higher weight to behavior data closer to a start of a time period and farther from the current time, wherein the behavior data repeats during each time period of a same length; and determining the periodicity factor comprises:

determining a date difference between the $i^{th}$ day on which the behavior data is generated and the $j^{th}$ day; and generating the periodicity factor according to the date difference;

weighting the behavior data of the time at which the behavior data is generated and the current time to generate a weighted value, wherein the weighted value is based on at least one of the timeliness factor or the periodicity factor;

adjusting the behavior data using the weighted value;

ranking the search results based on the adjusted behavior data; and providing the ranked search results to the user.

9. The apparatus for providing ranked search results to a user based on user behavior data according to claim 8, wherein adjusting the behavior data comprises:

obtaining a product of the timeliness factor and the behavior data as first behavior data; and generating second behavior data according to the periodicity factor, the behavior data, and the first behavior data.

10. The apparatus for providing ranked search results to a user based on user behavior data according to claim 8, wherein determining the timeliness factor comprises:

determining a time difference between a date on which the behavior data is generated and a current date; and determining the timeliness factor according to the time difference and a time attenuation function.

11. A non-transitory computer readable medium that stores a set of instructions that is executable by at least one processor of a computer to cause the computer to perform method for providing ranked search results to a user based on user behavior data, comprising:

acquiring behavior data of the user from a search engine user behavior log, wherein the search engine user behavior log comprises a plurality of entries comprising:

feature data associated with the behavior data;

label data associated with click behavior; and a time corresponding to the behavior data being generated according to the search engine;

determining a timeliness factor and a periodicity factor corresponding to the behavior data according to a time at which the behavior data is generated and a current time, wherein the time at which the behavior data is generated and the current time are an $i^{th}$ day and a $j^{th}$ day in a preset time period having N days;

the timeliness factor provides a higher weight to behavior data closer to the current time;

the periodicity factor provides a higher weight to behavior data closer to a start of a time period and farther from the current time, wherein the behavior data repeats during each time period of a same length; and determining the periodicity factor comprises:

determining a date difference between the $i^{th}$ day on which the behavior data is generated and the $j^{th}$ day; and generating the periodicity factor according to the date difference;

weighting the behavior data of the time at which the behavior data is generated and the current time to generate a weighted value, wherein the weighted value is based on at least one of the timeliness factor or the periodicity factor;

adjusting the behavior data using the weighted value;

ranking the search results based on the adjusted behavior data; and providing the ranked search results to the user.

12. The non-transitory computer readable medium according to claim 11, wherein adjusting the behavior data comprises:

obtaining a product of the timeliness factor and the behavior data as first behavior data; and generating second behavior data according to the periodicity factor, the behavior data, and the first behavior data.

13. The non-transitory computer readable medium according to claim 12, wherein generating second behavior data according to the periodicity factor, the behavior data, and the first behavior data comprises:

generating third behavior data according to the periodicity factor and the behavior data; and generating the second behavior data according to the first behavior data and the third behavior data.

14. The non-transitory computer readable medium according to claim 13, wherein the first behavior data is added to or multiplied by the third behavior data to generate the second behavior data.

15. The non-transitory computer readable medium according to claim 11, wherein determining the timeliness factor comprises:

determining a time difference between a date on which the behavior data is generated and a current date; and determining the timeliness factor according to the time difference and a time attenuation function.

16. The non-transitory computer readable medium according to claim 15, wherein the time attenuation function comprises at least one of an exponential function and a power function.

* * * * *